United States Patent [19]
Von Woff

[11] 3,840,064
[45] Oct. 8, 1974

[54] CORE AND MOLD TRANSFER DEVICE

[75] Inventor: Herbert Von Woff, Shaker Heights, Ohio

[73] Assignee: Acme-Cleveland Corporation, Cleveland, Ohio

[22] Filed: Aug. 2, 1972

[21] Appl. No.: 277,235

[52] U.S. Cl.................. 164/213, 164/404, 198/20
[51] Int. Cl............................................ B22c 17/00
[58] Field of Search...... 198/190, 20, 233; 214/310, 214/514, 731; 162/401, 404, 407, 213

[56] References Cited
UNITED STATES PATENTS

| | | | |
|---|---|---|---|
| 2,578,802 | 12/1951 | Heidrick | 214/514 |
| 2,958,436 | 11/1960 | Skutle | 214/731 |
| 3,269,565 | 8/1966 | Kemp | 214/310 |
| 3,388,785 | 6/1968 | Mothershaw | 198/190 |

FOREIGN PATENTS OR APPLICATIONS

| | | | |
|---|---|---|---|
| 1,265,656 | 4/1968 | Germany | 198/20 |

Primary Examiner—Richard E. Aegerter
Attorney, Agent, or Firm—Woodling, Krost, Granger & Rust

[57] ABSTRACT

A transfer device to transfer a mold from a first location to a remote location is disclosed having a transfer conveyor which is able to convey a mold lengthwise along a run of the conveyor and which transfer conveyor also is on a slide movable lengthwise of the conveyor between a first and a second position. The device is suitable for operation in a foundary between a mold box having ejection pins and a main conveyor whereby the transfer conveyor which can include a plurality of finger conveyors, interdigitates with the ejection pins to receive and transfer the mold to the main conveyor. The foregoing abstract is merely a resume of one general application, is not a complete discussion of all principles of operation or applications, and is not to be construed as a limitation on the scope of the claimed subject matter.

8 Claims, 7 Drawing Figures

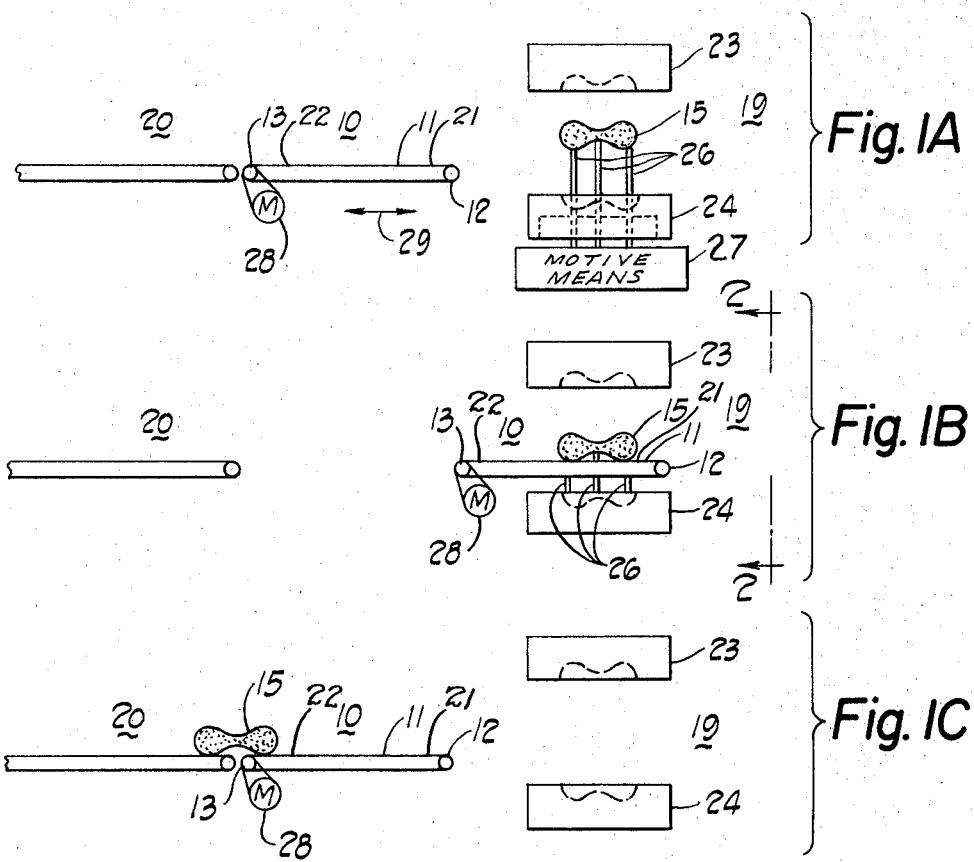
Fig. 1A
Fig. 1B
Fig. 1C
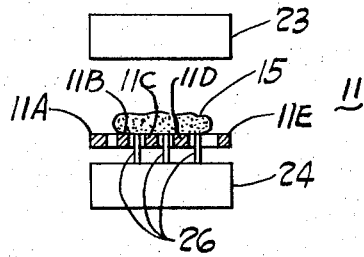
Fig. 2

CORE AND MOLD TRANSFER DEVICE

BACKGROUND OF THE INVENTION

In a foundry, either cores or molds may be made, and in this application the term mold is used to cover either a core or a mold.

The foundry machine art has known many apparatuses which are able to transfer a mold from a first location to a remote location. The primary application for such a transfer device is in the application where the transfer device removes a mold from a mold box of a mold making machine and transfers the mold to a location which is convenient for an operator to remove the mold and place upon a main conveyor to be taken to another location within the foundry. These prior art devices eliminated the need for an operator to extract the mold directly from the ejection pins of the mold box, but an operator was still required to transfer the mold from the transfer device to the main conveyor.

Therefore, an object of this invention is to produce a mold transfer device which is able to transfer a mold from a first location to a second location.

Another object of this invention is to produce a mold transfer device which is able to transfer a mold from the ejection pins of a mold box to a main conveyor.

Another object of this invention is to produce a mold transfer device which is compatible with existing mold making machines.

Another object of this invention is to produce a mold transfer device which is adaptable to changes in the location of mold box ejection pins.

SUMMARY OF THE INVENTION

The invention may be incorporated in a transfer device to transfer a mold from a first location to a remote location, comprising in combination, transfer conveyor means, said transfer conveyor means being movable between a first and a second position in a direction having a substantial horizontal component, movement means moving said transfer conveyor means to said first position to receive the mold, means driving said transfer conveyor means to enable conveyance of the mold thereby, and means establishing said transfer conveyor means to transfer the mold to the remote location when said transfer conveyor means is in one of said positions.

Other objects and a fuller understanding of the invention may be had by referring to the following description and claims, taken in conjunction with the accompanying drawing.

BRIEF DESCRIPTION OF THE DRAWINGS

FIG. 1 is the preferred embodiment showing a mold transfer device in three stages of operation;

FIG. 2 is a front view of the structure shown in FIG. 1B;

DESCRIPTION OF THE PREFERRED EMBODIMENT

Figure 3:
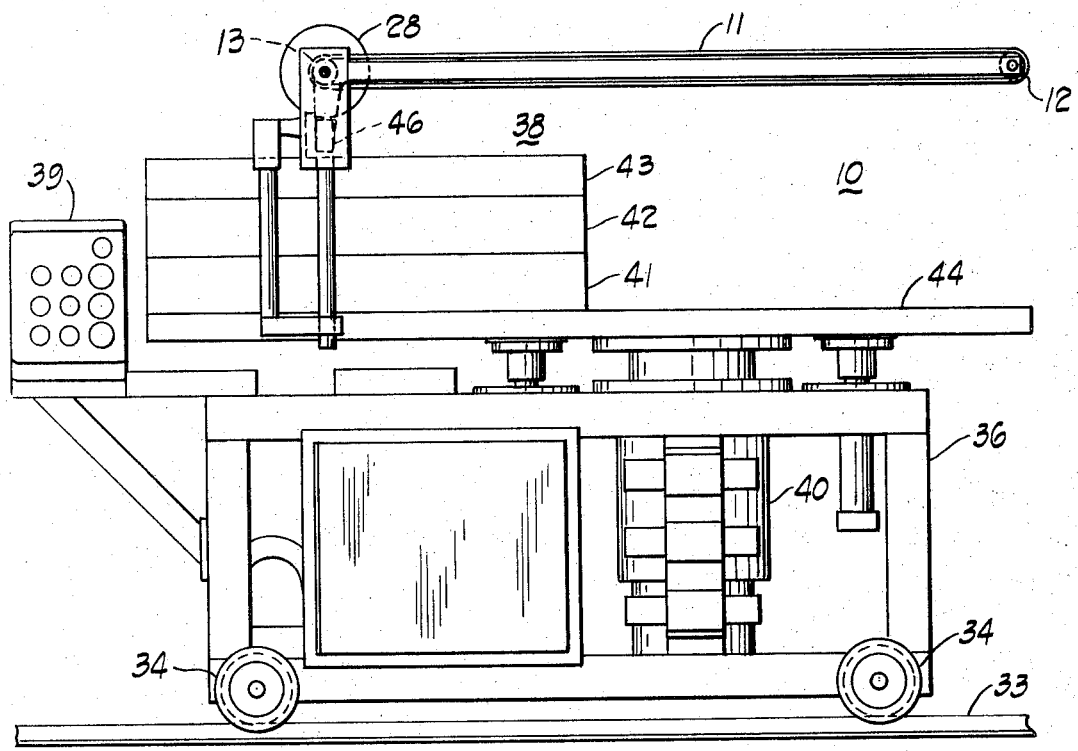
FIG. 3 illustrates a side view of a mold transfer device compatible with existing mold making machines.

FIG. 1 is the preferred embodiment of the present invention illustrating a transfer device 10 to transfer a mold 15 from a first location to a remote location comprising transfer conveyor means 11 which is shown as an endless ribbon conveyor supported by the end rollers 12 and 13. The ribbon conveyor 11 can be made of steel mesh or any appropriate material used in a foundry. The transfer device 10 is movable between a first and a second position in a direction having a substantial horizontal component. FIG. 1B illustrates the transfer conveyor means 11 in the first position, whereas FIG. 1A illustrates the transfer conveyor means 11 in the second position. The transfer device 10 includes movement means illustrated by the arrow 29 to move the transfer conveyor means 11 between the first and the second position. Means shown as a motor 28, drives the transfer conveyor means 11 to enable conveyance of the mold 15 between a first and a second longitudinal end shown as 21 and 22, respectively. The invention includes means establishing the transfer conveyor means 10 to transfer the mold to the remote location when the transfer conveyor means 11 is in one of the first and second positions which is shown in FIG. 1C as the transfer conveyor means 11 being in the second position adjacent to a main conveyor 20 which main conveyor 20 is occupying the position designated as the remote location.

FIGS. 1 and 2 illustrate the transfer of the mold 15 from a mold machine 19 to the main conveyor 20 in which case the mold 15 is supported by support means 26 which support means expose a portion of the bottom of the mold 15. For example, the support means 26 could be ejection means or ejection pin means of a mold box composed of the mold box halfs 23 and 24 to eject the finished mold therefrom by motive means 27. The ejection pin means 26 are shown oriented in a substantially vertical direction and transverse to the conveyance direction of the transfer conveyor means 11.

The transfer device 10 transfers the mold 15 to the main conveyor 20 in the following manner. FIG. 1A illustrates the completed mold 15 ejected from the mold box halfs 23 and 24 and the ejection pin means 26 supporting the mold 15. The movement means illustrated by the arrow 29 moves the transfer conveyor means 11 into the first position to receive the mold 15 as illustrated in FIG. 1B. The mold 15 can be received by the transfer conveyor means 11 by either retracting the ejection pin means 26 to lower the mold 15 onto the transfer conveyor means 11 or the transfer conveyor means 11 can be raised to remove the mold 15 from the ejection pin means 26. The former of the two methods is shown in FIG. 1 but either of these movements or a combination of both are within the contemplation of the invention. After the transfer conveyor means 11 has received the mold 15, the movement means moves the transfer conveyor means 11 to the second position to be adjacent to the main conveyor 20 and concomitantly or subsequently therewith the driving means 28 drives the transfer conveyor means 11 to convey the mold 15 from the first longitudinal end 21 to the second longitudinal end 22 to transfer the mold 15 to the main conveyor 20. Thus, the transfer of the mold 15 from the mold machine 19 to the main conveyor 20 has been accomplished in a completely automated fashion.

FIG. 2 illustrates the front view of FIG. 1B showing the transfer conveyor means 11 including a plurality of finger conveyor means 11A–11E which are interdigitated with the ejection pin means 26. The transfer conveyor means 11 can be either a solid conveyor or a plurality of finger conveyors as illustrated in FIG. 2 depending upon the need and arrangement of the ejection pin means 26 which is determined in part by the configuration of the mold 15 to be fashioned.

Figure 4:
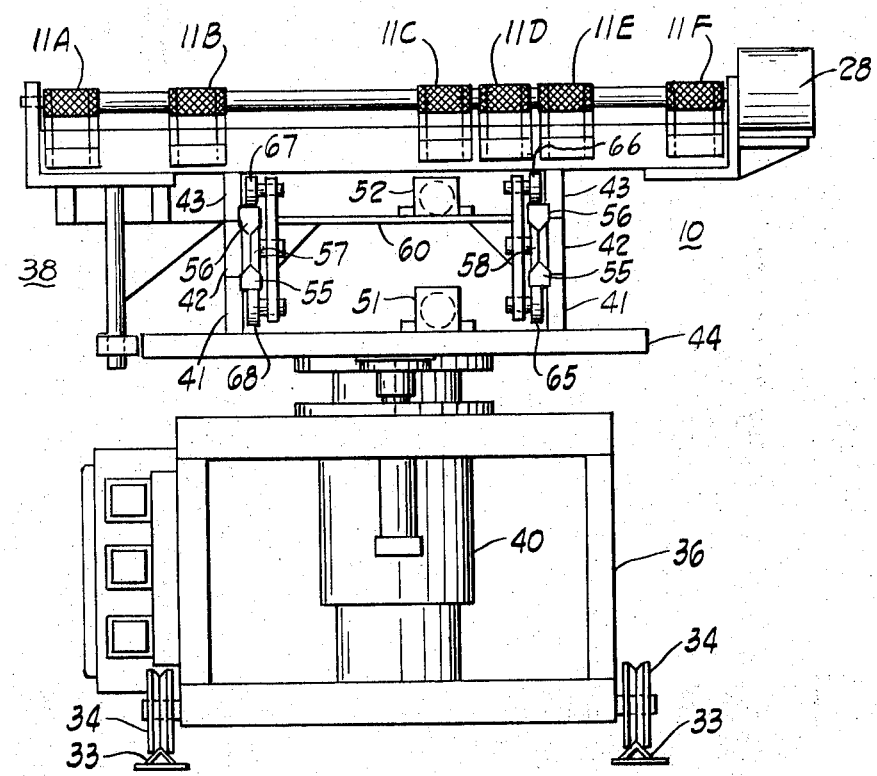
FIG. 4 shows a front view of the mold transfer device illustrated in FIG. 3.
Figure 5:
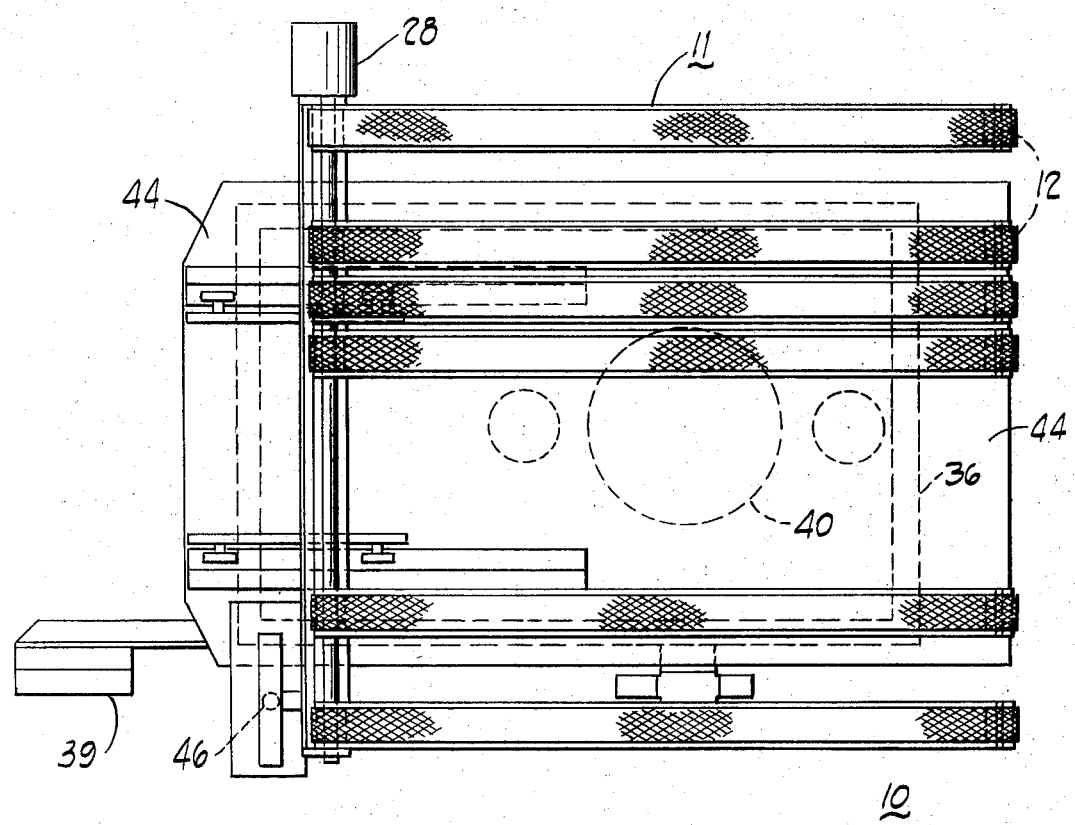
FIG. 5 is a top view of the mold transfer device illustrated in FIG. 3.

FIGS. 3 and 4 illustrate a practical construction of the transfer device 10 including frame means 36 having wheels 34 resting upon a track 33. The frame means 36 can be fixed relative to a mold making machine by either locking the wheels 34 or fastening the frame means 36 to the mold making machine. The frame means 36 supports a vertical hydraulic cylinder means 40 which is able to raise a sub-frame 44 on which is carried a horizontal hydraulic cylinder means 38 and the transfer conveyor means 11. The vertical movement of the hydraulic cylinder means 40 may be used to adjust the level of the transfer conveyor 11 relative to a mold making machine or may be used to raise the transfer conveyor means 11 to lift the mold 15 off the ejection pin means 26 as previously described. The horizontal hydraulic cylinder means 38 are included within the movement means, previously referred to as the arrow 29, to move the transfer conveyor means 11 in a direction having a substantial horizontal component. The hydraulic cylinder means 38 includes a base 41, a first slidable member 42 and a second slidable member 43.

The base 41 is connected to the sub-frame 44 and the first slidable member 42 is slidably mounted on the base 41. The movement means 38 includes first and second hydraulic cylinder means 51 and 52, respectively. The first hydraulic cylinder means 51, shown in FIG. 4, interconnects the base 41 with the first slidable member 42 and has a maximum movement, for example, of 20 inches. The second slidable member 43 is slidably mounted on the first slidable member 42 and is interconnected by the second hydraulic cylinder means 52 shown in FIG. 4. Assuming the second hydraulic cylinder means 52 to have a maximum movement of 20 inches, the total movement of the transfer conveyor means 11 is 40 inches which is the sum of the movement of the first slide member 42 relative to the base 41 and the movement of the second slide member 43 relative to the first slide member 42. The control panel 39 controls the manual operation of the transfer device 10. In addition, the device may be interconnected with a mold making machine to be automatically controlled.

FIG. 4 illustrates a front view of the transfer device 10 and shows in greater detail the horizontal hydraulic cylinder means 38. A first track 55 is fixed to the base 41 upon which wheels 57 and 58 move along. The wheels 57 and 58 are mounted to a carriage 60 which is connected to the first slide member means 42. The first hydraulic cylinder means 51 interconnects the sub-frame 44 and base 41 with the carriage 60. A second track 56 is fixed relative to the second slide member means 43 and is mounted on top of the wheels 57 and 58. The relationship between the first and second tracks 55 and 56 and the wheels 57 and 58 are maintained by the guide wheels 65–68. The second hydraulic cylinder means 52 is mounted upon the carriage 60 and is connected to the second slide member 43. Thus, the rotation of the wheels 57 and 58 are used to establish the simultaneous movement of both the first and the second slide member means 42 and 43.

The transfer conveyor means 11 is pivotally mounted by a pivot axis 46 to the second slide member means 43 to enable rotation thereof and to enable conveyance of a mold in two dimensions which dimensions are contained within a horizontal plane Rotation of the transfer conveyor means 11 can be accomplished by either a motor or a hydraulic cylinder, neither of which is shown. FIG. 4 illustrates the transfer conveyor means 11 has a plurality of finger conveyor means 11A–11F which are each driven by the motor 28. Each of the finger conveyor means can be laterally moved in FIG. 4 relative to each other to change the finger spacing therebetween to accommodate for different arrangements in the ejection pins means of a mold box. The finger conveyor means 11A–11F are manually movable by moving the rollers 13 along the shaft of motor 28 to adjust the transverse spacing. For example, the spacing between finger conveyor means 11B and 11C is large in order to accommodate a large number of ejection pin means whereas the spacing between finger conveyor means 11C and 11E is essentially zero since there are no ejection pin means to be accommodated for in that position. In addition to varying the position of each of the finger conveyor means, the total number of the finger conveyor means can be increased or decreased depending upon the application thereof.

The foregoing specification has described the mold transfer device in a particular application of transferring a mold from a mold machine to a main conveyor. However, the transfer device as contemplated by this invention is suitable for use for transferring any mold or core or like material from a first location to a remote location. Among these locations are other conveyors, storage racks, shop trucks, machines, platforms and the like.

The present disclosure includes that contained in the appended claims, as well as that of the foregoing description Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A transfer device in combination with a mold machine and a main conveyor, said mold machine having spaced support means movable with a substantial vertical component and adapted to support a mold, said support means exposing a portion of the bottom of the mold, said transfer device comprising in combination, frame means,
a plurality of finger conveyor means movably mounted to said frame means to move in a direction having a substantial horizontal component,
each of said finger conveyor means having a longitudinally movable endless web,
movement means moving said finger conveyor means to a first position to interdigitate said finger conveyor means with the support means below the mold,
means mounting said plurality of finger conveyor means to be transversely movable to change the spacing between said transversely movable finger conveyor means in accordance with the transverse spacing of the support means, means moving one of said finger conveyor means and the support means relative to said frame means in a direction having a substantial vertical component to enable said finger conveyor means to receive the mold, motor means driving said endless webs of said finger conveyor means to convey the mold between the longitudinal ends thereof, and said movement means moving said finger conveyor means to a second position to establish said finger conveyor means adjacent to the main conveyor to transfer the mold thereto.

2. A transfer device as set forth in claim 1, wherein said moving means moves the support means.

3. A transfer device as set forth in claim 1, wherein said support means are pin means.

4. A transfer device as set forth in claim 3, wherein the pin means are ejection pin means of the mold machine.

5. A transfer device as set forth in claim 3, wherein the pin means are substantially vertical.

6. A transfer device as set forth in claim 1, wherein said moving means includes raising said finger conveyor means to lift the mold off the support means.

7. A transfer device as set forth in claim 1, wherein said movement means moving said finger conveyor means includes hydraulic means.

8. A transfer device in combination with a mold machine and a main conveyor, said mold machine having substantially vertical spaced ejection pin means to support a mold, said transfer device comprising in combination, frame means fixed relative to the mold making machine, a plurality of finger conveyor means slidably mounted to said frame means to move in a direction having a substantial horizontal component, said finger conveyor means each having a ribbon conveyor and each being substantially parallel to one another in a substantially horizontal plane, means mounting said plurality of finger conveyor means to be transversely movable to change the spacing between said transversely movable finger conveyor means in accordance with the spacing of the ejection pin means, hydraulic means moving said finger conveyor means in a direction substantially parallel to said finger conveyor means to a first position to interdigitate said finger conveyor means with the ejection pin means below the mold, means moving one of said finger conveyor means and the ejection pin means in a direction having a substantial vertical component to enable a first longitudinal end of said finger conveyor means to receive the mold, motor means driving said ribbon conveyors of said finger conveyor means to convey the mold from said first end to a second longitudinal end of said finger conveyor means, and said hydraulic means moving said finger conveyor means to a second position to establish said second end of said finger conveyor means adjacent to the main conveyor to transfer the mold thereto.

* * * * *